United States Patent [19]

Fanelli et al.

[11] 4,387,085

[45] Jun. 7, 1983

[54] PROCESS FOR PREPARING HIGH SURFACE AREA ALUMINA

[75] Inventors: Anthony J. Fanelli, Rockaway; Arthur T. Walsh, Morris Plains, both of N.J.

[73] Assignee: Allied Corporation, Morris Township, Morris County, N.J.

[21] Appl. No.: 324,722

[22] Filed: Nov. 25, 1981

[51] Int. Cl.$^3$ ............................................. C01F 7/02
[52] U.S. Cl. ...................................... 423/630; 423/628
[58] Field of Search ................................ 423/628, 630

[56] References Cited

U.S. PATENT DOCUMENTS

| | | | |
|---|---|---|---|
| 2,749,216 | 6/1956 | Dimeriddie et al. | 423/630 |
| 2,805,920 | 9/1957 | Richardson | 423/630 |
| 2,917,366 | 12/1959 | Hansford | 423/630 |
| 3,357,791 | 12/1967 | Napier | 423/630 |
| 3,394,990 | 7/1968 | Weingaertner et al. | 423/630 |
| 3,417,030 | 12/1968 | O'Hara et al. | 423/628 |

Primary Examiner—Herbert T. Carter
Attorney, Agent, or Firm—Alan M. Doernberg; Gerhard H. Fuchs

[57] ABSTRACT

A high surface area alumina is prepared by heating a solution of an aluminum trialkoxide in a secondary or tertiary alcohol solvent to a sub-critical temperature at which the solvent decomposes to form water, and the water so formed hydrolyzes the aluminum trialkoxide. Solutions include aluminum tri-s-butoxide in s-butanol. The resultant aluminas have surface areas 500 m$^2$/g or greater.

4 Claims, No Drawings

PROCESS FOR PREPARING HIGH SURFACE AREA ALUMINA

High surface area aluminum oxides and hydroxides are used in a variety of applications such as catalyst supports and polymer modifiers. Such materials include fumed alumina prepared by hydrolysis at high temperature of aluminum halides such as $AlCl_3$.

S. J. Teichner and coworker have prepared aerogels by hydrolyzing organometal compounds including aluminum triisopropoxide with water in an organic solvent (e.g. methanol) in an autoclave above the critical temperature of the solvent. By venting the solvent and byproduct alcohol supercritically, a high surface area alumina is prepared. Such processes consume relatively large amounts of energy because of the high temperatures required.

BRIEF DESCRIPTION OF THE PRESENT INVENTION

The present invention includes a process of preparing high surface area aluminas by the use of certain solvents without the necessity of the high temperatures required to vent the solvent supercritically. The process comprises the steps:

(a) dissolving an aluminum trialkoxide in a secondary or tertiary alcohol solvent to form a solution, (b) heating the solution to a first temperature below the critical temperature to said solvent at which the solvent decomposes to form an alkene or ether and water, and the water so formed hydrolyzes the aluminum trialkoxide to form alumina and alkanol;

(c) cooling the solution to a temperature at which the decomposition of solvent stops; and (d) recovering the alumina as a dry material of surface area at least about 500 $m^2/g$.

DETAILED DESCRIPTION OF THE INVENTION

The present process employs an aluminum trialkoxide and a secondary or tertiary alcohol solvent in which the aluminum trialkoxide is soluble. Suitable aluminum trialkoxides include the trimethoxide, triethoxide, tri-s-propoxide, tri-n-propoxide, tri-n-butoxide, tri-s-butoxide, tri-t-butoxide, tri-1-methylbutoxide, tri-1,1-dimethylbutoxide and other similar aluminun compounds with three alkoxides, each of 1-6 carbons or more. It is preferred that all three alkoxides are the same and more preferred that they be secondary or tertiary alkoxides. More preferred are the tri-s-butoxide, tri-s-propoxide and tri-t-butoxide; and most preferred is aluminum tri-s-butoxide.

The solvent may be any secondary or tertiary alcohol capable of dehydrating on heating (e.g. to 150°–250° C.) with preferably 3–8 carbons. If the aluminum alkoxide is secondary or tertiary, then it is preferred that the solvent correspond (e.g. aluminum tri-s-butoxide in s-butanol or aluminum tri-t-butoxide in t-butanol). Thus the preferred solvents are s-butanol, t-butanol, isopropanol and 2-pentanol.

While other materials including water may be present in the solution before heating, water is preferably not present because water may hydrolyze the aluminum trialkoxide to insoluble aluminum hydroxide or oxide before a desired high temperature is reached. This alumina will not have an aerogel-like structure because the solvent surface tension at the reaction temperature will be too high. It is contemplated that other materials may be present to dope the alumina when formed, such as volatile acids (e.g. acetic acid), volatile bases (e.g. ammonia), fluoride compounds (e.g. ammonium fluoride), dopant metal or metalloid compounds (e.g. lanthanum isopropoxide). The presence of these dopants may affect the crystalline structure of the alumina formed (e.g. boehmite or eta, chi, gamma, delta or amorphous alumina, or mixtures of these structures) or its hydroxyl content or its physical and chemical properties (e.g. surface area, pore volume, pore size distribution, hydrophobicity, reactivity with transition metal chlorides such as $TiCl_4$). These properties, and especially the hydroxyl content, may be further modified by calcining or otherwise treating the aluminas formed in the present process.

The process of the present invention includes heating the solution to a temperature where dehydration of the solvent occurs. In the case of s-butanol this temperature is about 255° C. Generally this temperature is sufficiently high for the water formed to immediately hydrolyze the aluminum trialkoxide to an "alumina" (which may still contain some hydroxyl and/or alkoxide functionality). This product precipitates as a high surface area solid which is sufficiently strong to maintain its structure even when the system is cooled and the solvent decanted off. In this regard aluminas differ from silicas, since a similarly prepared silica will collapse if the system is cooled with solvent still present.

Once the high surface area alumina is formed, it may be dried in a vacuum oven, calcined at high temperatures in air or otherwise and treated to remove residual solvent and to convert more of the remaining hydroxide and/or alkoxide functionalities to oxide (e.g. by calcining).

The alumina so produced may be used as a catalyst support, e.g. for $TiCl_4$ used to polymerize ethylene in the manner of U.S. Pat. Nos. 3,506,633, 3,513,150, 4,247,669 or 3,978,031. Alumina catalysts and catalyst supports are also used for the Claus reaction, dehydration of alcohols, isomerization of olefins and the like. The alumina may also be used in non-catalytic applications such as in fiber and spinning applications and as a gelling agent in polar liquids.

EXAMPLE 1

A solution was prepared in a glass test tube consisting of 5.0 g of aluminum s-butoxide, 95.0 g of s-butanol and 1.0 $cm^3$ of water. The test tube was placed in a 300 $cm^3$ stainless steel autoclave and the autoclave heated without stirring at 255°±5° C. for 0.5 hr. The autoclave was opened after it had cooled to room temperature, revealing a fluffy white solid suspended in the liquid solvent. The filtered solid weighed 1.18 g after drying at 110° C. in a vacuum oven for 24 hours. The material had a bulk density of 0.34 $g/cm^3$, BET surface area of 366 $m^2/g$. X-ray analysis indicated the sample to be composed of crystalline boehmite.

EXAMPLE 2

The procedures of Example 1 were followed except that no water was added to the aluminum s-butoxide/s-butanol solution. 1.09 g of solid was obtained after filtering and drying at 110° C. in a vacuum oven for 20 hours. Analysis of the filtrate revealed that water had been formed, in situ, in the reaction. The solid had a bulk density of 0.075 $g/cm^3$, BET surface area of 678 $m^2/g$ and pore volume of 2.3 cm³/g (mercury porosimetry) and gave an amorphous X-ray pattern.

EXAMPLE 3

The procedures of Example 1 were followed except that the reaction temperature was 283° C. The yield of solid was 1.26 g. It had a bulk density of 0.32 g/cm³, BEt surface area of 283 m²/g and gave an X-ray pattern similar to that of boehmite.

EXAMPLE 4

The procedure of Example 1 were followed except that 0.37 cm³ of water was used. The yield of solid amounted to 1.29 g. It had a bulk density of 0.19 g/cm³, BET surface area of 516 m²/g and pore volume of 1.50 cm³/g (mercury porosimetry) and gave an X-ray pattern indicative of the presence of a mixture of phases: eta, chi, gamma and delta.

EXAMPLE 5

This run was carried out as described in Example 4 except that the reaction solution also contained 0.075 g NH₄F. The solid isolated was 1.30 g with a bulk density of 0.28 g/cm³ and BET surface area of 399 m²/g. It gave an X-ray pattern resembling that of eta alumina.

EXAMPLE 6

The procedures were as describe in Example 2 except that the reaction solution also contained 0.16 g of lanthanum isopropoxide and the heating time at 225°±5° C. was extended to 1 hour. The solid amounted to 1.27 g. It had a bulk density of 0.085 g/cm³ and BET surface area of 592 m²/g and gave an X-ray pattern indicative of boehmite.

EXAMPLE 7

The procedures were similar to those described in Example 2 except that a reaction temperature of 270° C. was used. The isolated solid was 1.16 g. It had a bulk density of 0.21 g/cm³ and BET surface area of 231 m²/g and gave an X-ray pattern indicating presence of a mixture of chi and eta aluminas.

EXAMPLE 8

The procedures were similar to those of Example 4 except that the solvent was vented at reaction temperature following 0.5 hr at 255°±8° C. The isolated solid amounted to 1.31 g. It had a bulk density of 0.103 g/cm³ and BET surface area of 399 m²/g and gave an X-ray pattern resembling that of eta alumina.

EXAMPLE 9

Procedures were as described in Example 8 except that 1.1 cm³ of water were used in the reaction solution, and the reactor was vented at 250° C. following 1 hr at 250° C. and 2 hr at 210° C. The solid weighing 1.86 g, had a BET surface area of 715 m²/g and gave an X-ray pattern resembling that of boehmite.

EXAMPLE 10

The procedures were as described in Example 4 except that the heating time was extended to 3.25 hours. The solid isolated weighed 1.24 g. It had a bulk density of 0.28 g/cm³ and a BET surface area of 259 m²/g and gave an X-ray pattern indicating the presence of chi, eta and amorphous aluminas.

EXAMPLE 11

The procedures of example 1 were followed except that the charge contained 140 g of s-butanol, 15.5 g of aluminum s-butoxide and 0.56 mL of concentrated hydrochloric acid. After a total reaction time of 3 hours and 35 minutes (including heat up) 3.26 g of product were obtained. The product had a bulk density of 0.10 g/cm³, BET surface area of 988 m²/g and pore volume (Hg porosimetry) of 3.91 cm³/g. The solid contained 1 w % Cl by elemental analysis and the filtrate contained 0.2 w % H₂O. The solid gave an amorphous X-ray pattern.

EXAMPLE 12

The procedures of example 11 were followed except that the charge contained 120 g of s-butanol, 13.3 g of aluminum s-butoxide and 0.16 g of aqueous HF (49% solution). Total reaction time was 4 hours, 10 minutes (including heat up). The product amounted to 2.7 g and had the following properties: 0.10 g/cm³ bulk density; 695 m²/g BET surface area and 2.02 cm³/g pore volume (Hg porosimetry). The solid contained 1.55 w % F by elemental analysis and the filtrate contained 0.23% H₂O. X-ray analysis of the solid produced a predominantly amorphous pattern.

EXAMPLE 13

Materials prepared as in Examples 11 and 12 were each converted into olefin polymerization catalysts by the following procedures. Each dried alumina was calcined at conditions given in Table 1. The calcined alumina was then mixed with 0.108 g TiCl₄ in 3.45 mL of heptane. The products were then dried at 25° C. under vacuum. The Ti and Cl contents of each catalyst were measured by standard methods. Into a 450 mL reactor was charged catalyst, tributylaluminum, ethylene to a pressure of 22.5 psi absolute (155 kPa) and hydrogen to a pressure of 33.75 psi absolute (233 kPa). Using a reaction temperature of 85° C. and sufficient ethylene feed to maintain the pressure, polyethylene was produced over a period of one hour. The product was weighed and a first activity was calculated based upon grams polyethylene per gram catalyst, hours reaction and atmosphere ethylene pressure. A second activity was calculated based upon grams polyethylene per gram Ti in the catalyst, hour reaction and atmosphere ethylene pressure. Table 1 illustrates these results for the various catalysts.

TABLE 1

| Alumina of Example | 11 | 11 | 12 |
|---|---|---|---|
| % Ti | 4.56 | 5.14 | 0.99 |
| % Cl | 9.65 | 12.33 | not analyzed |
| % F | — | — | 2.85 |
| Activity* | 194 | 111 | 56.1 |
| Activity** | 4254 | 2160 | 5667 |
| Calcination Conditions | | | |
| Temp°C./Gas | 700°/O₂ | 600°/O₂ | 700°/N₂ |
| Catalyst wt, mg | 81 | 48 | 71 |
| Tributylaluminum, mg | 0.080 | 0.048 | 0.71 |

*Based on g catalyst
**Based on g Ti in catalyst

What is claimed is:

1. A process for preparing a high surface area alumina which comprises the steps:

(a) dissolving an aluminum trialkoxide in a secondary or tertiary alcohol solvent to form a water-free solution, (b) heating the water-free solution to a first temperature at which the solvent decomposes to form an alkene or ether and water, and the water so formed hydrolyzes the aluminum trialkoxide to form alumina and alkanol; said first temperature being below the critical temperature of said solvent;

(c) cooling the solution to a temperature at which the decomposition of solvent stops; and (d) recovering the alumina as a dry material of surface area at least about 500 m$^2$/g.

2. The process of claim 1 wherein said aluminum tri-alkoxide is of the formula Al(OR)$_3$ wherein R is s-alkyl of 3–6 carbons and said solvent is a secondary alcohol of 3–6 carbons, said alkanol formed in said step (b) corresponding to said solvent.

3. The process of claim 2 wherein said aluminum trialkoxide is aluminum tri-s-butoxide and said solvent is s-butanol.

4. The process of claim 1 or 2 or 3 wherein said first temperature is between about 200° C. and about 300° C.

* * * * *